United States Patent
Tachi et al.

[11] Patent Number: 6,045,229
[45] Date of Patent: Apr. 4, 2000

[54] METHOD AND APPARATUS FOR DISPLAYING REAL SPACE AND VIRTUAL SPACE IMAGES

[75] Inventors: Susumu Tachi, Tsukuba; Taro Maeda, Tokyo; Shinsuke Suzuki, Kawasaki, all of Japan

[73] Assignee: Minolta Co., Ltd., Osaka, Japan

[21] Appl. No.: 08/896,973

[22] Filed: Jul. 18, 1997

[30] Foreign Application Priority Data

Oct. 7, 1996 [JP] Japan .................................. 8-265935

[51] Int. Cl.⁷ .................................................. G03B 21/14
[52] U.S. Cl. ............................ 353/28; 353/121; 353/122; 359/630; 345/7
[58] Field of Search ........................... 353/28, 30, 122, 353/121; 359/630, 618; 345/7, 8, 9

[56] References Cited

U.S. PATENT DOCUMENTS

| | | | |
|---|---|---|---|
| 5,296,854 | 3/1994 | Hamilton et al. | 345/9 |
| 5,483,307 | 1/1996 | Anderson | 353/28 |
| 5,491,510 | 2/1996 | Gove | 345/8 |
| 5,515,122 | 5/1996 | Morishima et al. | 353/28 |
| 5,712,732 | 1/1998 | Street | 359/630 |
| 5,815,411 | 9/1998 | Ellenby et al. | 345/9 |

OTHER PUBLICATIONS

Shinsuke Suzuki et al, "Design of Visual Display for Augmented Reality—Fusion of Real and Virtual Space Image Using Depth from Viewpoint–", Proceedings of the 35th SICE Annual Conference, Domestic Session Papers vol. I, 107 D–2, (Jul. 24–26, 1996) with an English translation thereof.

Matthias M. Wloka et al, "Resolving Occlusion in Augmented Reality", Proceedings of 1995 Symposium on Interactive 3D Graphics, pp. 5–12, (1995).

*Primary Examiner*—William Dowling
*Attorney, Agent, or Firm*—Sidley & Austin

[57] ABSTRACT

A camera is arranged at a conjugate position to eyes of the observer. A distance from the observer to a pixel in the real space image located at the same position as a pixel in the virtual space image is determined according to the real space image picked up by the camera. A virtual space image is generated based on virtual space information stored beforehand. Then, the distance of the real space image is compared with that of the virtual space image, and one of the pixels more near the observer is selected for the display. This processing is performed on each pixel, and the real space image and the virtual space image are integrated as an image to be displayed for the observer at the same time.

26 Claims, 5 Drawing Sheets

$X1 = -R\tan\theta$ $(\theta - \alpha)$ $$T_1^2 = \left(\begin{array}{c|c} R & t \\ \hline 0 & 1 \end{array}\right)$$

$$= \left(\begin{array}{c|c} I & t \\ \hline 0 & 1 \end{array}\right)\left(\begin{array}{c|c} R & 0 \\ \hline 0 & 1 \end{array}\right)$$

$$l = \begin{pmatrix} l_x \\ l_y \\ -f \end{pmatrix} = -\frac{X}{x_z}f$$

METHOD AND APPARATUS FOR DISPLAYING REAL SPACE AND VIRTUAL SPACE IMAGES

BACKGROUND OF THE INVENTION

1. Field of the Invention

The present invention relates to a method and an apparatus for displaying real space and virtual space images.

2. Description of Prior Art

Virtual reality (VR) technique is developed to present information prepared by a computer to a man and makes him or her recognize as if he or she is in a real world. By using the virtual reality technique, a man comes into a virtual environment and has the same experience as in a real world. Virtual reality is also called as artificial reality.

Virtual reality technology includes a field called as augmented reality (AR). In the augmented reality, a real space mixed with a virtual space prepared by a computer is presented to a man. That is, augmented reality augments the real space by the virtual space.

In the virtual reality technology, a man is surrounded completely in the virtual environment. On the other hand, the augmented reality technology has an object to increase the quality of the real environment by arranging virtual environment appropriately to the real environment. Visual augmented reality presents an image as virtual environment. Visual augmented reality is referred hereinafter to as augmented reality.

Augmented reality technique will be used for systems, for example, for operation by superposing a computerized tomography scan image of a brain of a patient with the real brain, for supporting construction, repair or the like of a machine by adding comments with computer graphics to each components of the real machine, for evaluating how a furniture looks when it is added to an actual room, and for evaluating how a new building affects the environment in full-scale when it is built in the redevelopment of a city.

See-through head mounted display (STHMD) is used usually for presenting real and virtual spaces at the same time in augmented reality technique. STHMD systems includes a system using an optical system and a system using video signals.

FIG. 1 shows a principle of an augmented reality system with a see-through head mounted display using an optical system. An observer 80 can see a real space image through a half-mirror 81 placed in a line of sight before his or her eyes EY. On the other hand, the observer 80 also sees a virtual space image projected by a projector 82 reflected by the half-mirror 81. Thus, the virtual space image overlaps the real space image. A position detector (PD) 83 is set on the head of the observer 80 to detect a viewing point, and a work station (WS) 84 sends signals of the virtual space image to the projector 82 according to the output of the position detector 83.

FIG. 2 shows another augmented reality system with a see-through head mounted display using video signals. Two cameras 93 are arranged at positions conjugate to the left and right eyes EY of an observer 90 and pick up a real space image reflected by a double sided mirror 91. A work station 95 synthesizes the real space image with a virtual space image, and a projector 92 projects the synthesized image to the mirror 91 and present it to the observer 90. A position detector (PD) 83 is also set on the head of the observer 90 to detect a viewing point in this system.

In order to realize augmented reality, it is necessary to present correctly cover relation so that a farther space or object is covered by a space or object nearer to the observer, besides the position adjustment which is a problem already known. However, the above-mentioned prior art augmented reality systems cannot represent cover relation correctly. In the augmented reality system using an optical system, it is determined that real space is transparent behind an object in virtual space. Thus, an observer sees overlapped images of virtual space and real space, and the cover relation cannot be represented at all. In the augmented reality system using video signals, an object in virtual space always covers another object in real world irrespective of the distance. Then, the cover relation cannot be represented correctly as explained below. When an object in virtual space is nearer than another object in real world, cover relation is represented correctly. On the contrary, when an object in real space is nearer than another object in virtual world, the object in real space is covered by the object in virtual space which is farther than the object in real space, or the cover relation is reversed.

Vision psychology reports that if cover relation is not represented correctly, stereoscopic vision is inhibited, or unexpected stereoscopic vision happens because of the overlapping or the inconsistency of the observed image and the cover relation. Therefore, it is very important for augmented reality technology to represent cover relation correctly.

SUMMARY OF THE INVENTION

An object of the present invention is to provide an apparatus and method for augmented reality using video signals which represent cover relation correctly.

In one aspect of the invention of a method for displaying a real space image and a virtual space image, a pickup device is provided at a conjugate position of eyes of an observer, and it detects a real space image in real space. On the other hand, a virtual space image is obtained based on virtual space information. A distance from the observer to each of first pixels in the real space image is determined by using the detected image in correspondence to each of second pixels in the virtual space image. Then, the distance of each of the first pixels in the real space image is compared with that of a counterpart of the virtual space image, and one of the first pixel and the counterpart second pixel which is nearer to the observer is selected to present a synthesized image of the virtual space image and the real space image to the observer.

In a second aspect of the invention, a display apparatus for augmented reality comprises a pickup device provided at a position conjugated with eyes of the observer, and a position detector detecting a viewing point of the observer. A real space distance image generator generates a real space distance image which has distance data for each pixel in real space on the basis of a real space image picked up by the pickup device, while a virtual space distance image generator generating a virtual space image, which has distance data for each pixel in virtual space, on the basis of the position of the viewing point detected by the position detector and virtual space information stored beforehand. A comparator compares a distance of the real space image with that of the virtual space image for each pixel. Then, a selector selects for each pixel one of two corresponding pixels in the real space image and in the virtual space image which is nearer to the observer, and a display apparatus represents a synthesized image consisting of the pixels nearer to the observer selected by the selector.

In a third aspect of the invention, a display apparatus for augmented display comprises a pickup device which picks up a first two dimensional image (real space image), and a distance measurement device which measures first distance information (real space distance image), and a position detector detecting a viewing point of the observer. An output device outputs a second two dimensional image (virtual space image) and second distance information (virtual space distance image) for each pixel in the second two dimensional image on the basis of output data of the position detector and information stored beforehand. A comparator compares the first distance information with the second distance information for each pixel, and a selector selects for each pixel one of two corresponding pixels in the first distance information and in the second distance information which is nearer to the observer according to the comparison result of the comparator. Then, a display device can display the image information selected by the selector as a synthesized image consisting of the first and second two-dimensional images. The pickup device, the distance measurement device and the display device are arranged in the substantially same viewing direction as a viewing direction of the observer. In a different way, the distance measurement device measures the first distance information on the basis of a plurality of first two dimensional images picked up at different positions and outputs of the position detectors at the positions.

An advantage of the present invention is that cover relation is represented correctly to an observer in augmented reality.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
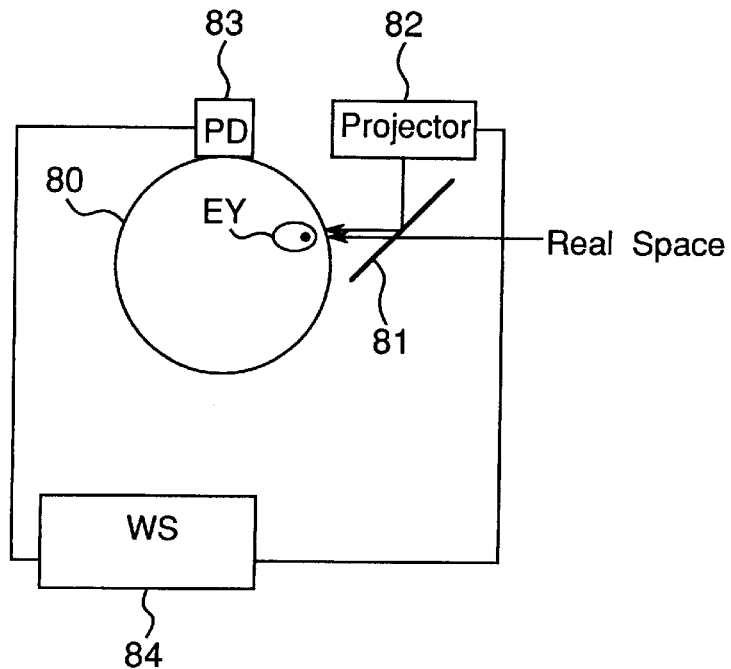
FIG. 1 is a diagram for explaining the principle of a prior art augmented reality system using prior art optical see-through head mounted display.
Figure 2:
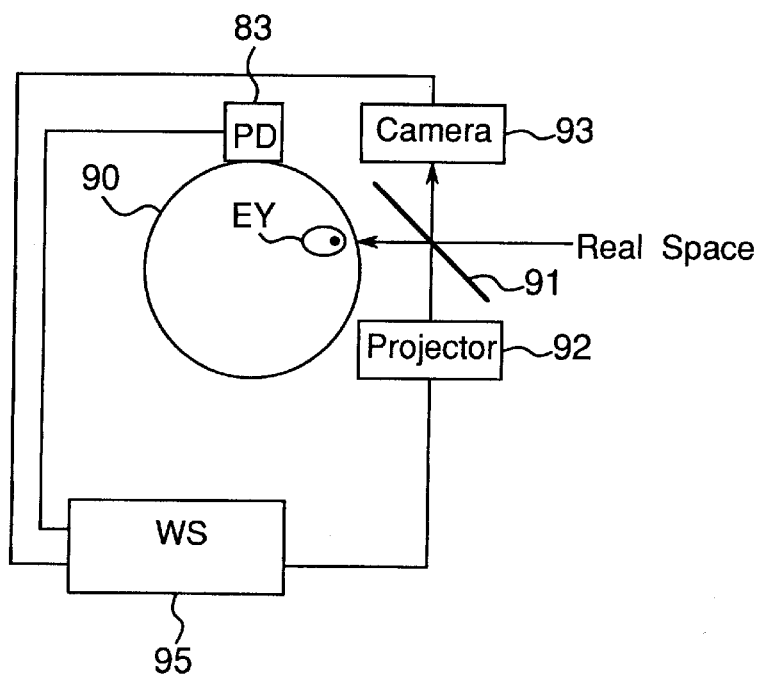
FIG. 2 is a diagram for explaining the principle of another prior art augmented reality system using prior art video see-through head mounted display.
Figure 3:
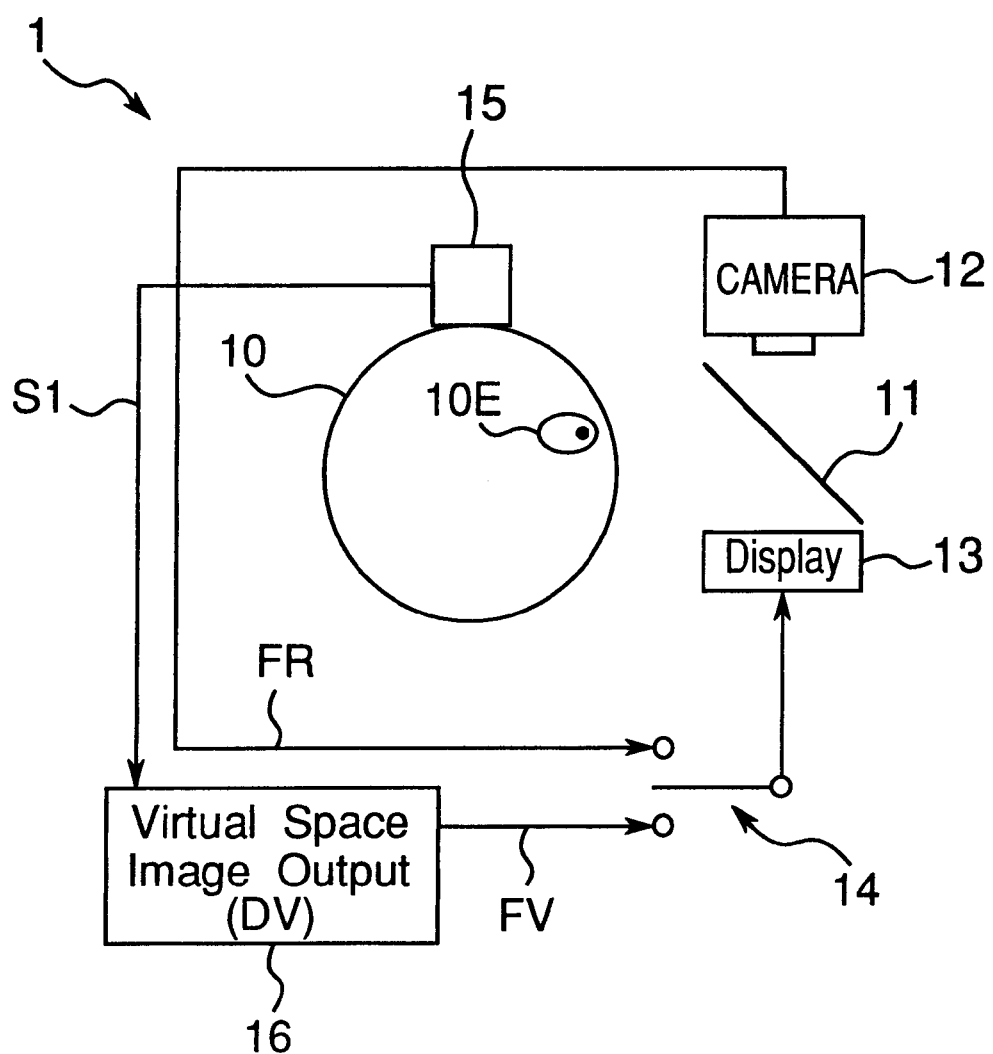
FIG. 3 is a general block diagram of a display apparatus of an embodiment the invention.

Referring now to the drawings, wherein like reference characters designate like or corresponding parts throughout the several views, FIG. 3 shows a general block diagram of a display apparatus for augmented reality using video signals. A mirror 11 has a reflection plane on both sides, and it is positioned before an eye 10E of an observer 10 so as to have an angle of 45° relative to a line of sight. A camera 12 is set at a position conjugate optically to the eye 10E to pick up a real space image (two dimensional image) FR reflected by the mirror 11. The camera 12 has a structure which converts an incident light through a lens to electrical signals, similar to a so-called digital camera, and it is used to measure distance by calculating the depth to an object based on the picked up image as will be explained below with reference to FIGS. 5 and 6. A display device 13 displays a synthesized image FM output from a cover pixel selector 14. The mirror 11, the camera 12 and the display device 13 are provided for each of the left and right eyes 10E. The observer 10 observes through the mirror 11 the synthesized image FM display by the displays device 13. The camera 12 and the display device 13 are arranged substantially on the same line of sight as the observer 10. The display device 13 comprises a known display device such as a liquid crystal panel or a cathode ray tube. Lenses and mirrors are added if necessary to the optical system.

The cover pixel selector 14 selects for each pixel one of a real space image FR obtained by the cameras 12 and a virtual space image FV in correspondence to a distance or depth from the viewing point of the observer 10 to the pixel, as will be explained later in detail. A position detector 15 attached to the observer 10 detects the viewing point of the observer 10. The position detector 15 and the detection of the viewing point are known in the art. A virtual space image output section 16 outputs the virtual space image FV based on a signal S1 from the position detector 15 and virtual space information DV stored beforehand. The virtual space information DV includes, for example, image data picked up in various ways, image data prepared by computer graphics, or a program for generating such image data.

The cover pixel selector 14 and the virtual space image output section 16 are fabricated as a hardware circuit, a computer program installed in an appropriate processor such as a personal computer or a work station, or an appropriate combination thereof. Such a program is stored in a random access memory, a read only memory, a hard disk or the like, or is read from a CD-ROM, a magneto-optical disk or a flexible disk, or is downloaded through a communication line from a host. The program can be supplied so as to be operated in various operation systems, and system environments or platforms.

In the display apparatus 1 shown in FIG. 3, distance coordinates from a viewing point are calculated on the basis of the real space image FR obtained by the cameras 12 in the position optically conjugate to the eyes 10E of the observer 10. A feature of the display apparatus 1 is that the real space image FR and the virtual space image FV are selected for each pixel according to the calculated distance from the viewing point, to generate a synthesized image FM to be represented to the observer 10.

In computer graphics generally, a Z buffer method is used to show cover relation correctly. In order to represent cover relation correctly for the real space and the virtual space similarly, a concept of Z-key was introduced. This represents an image by switching real space and virtual space according to z coordinate in the camera coordinate system. The cover pixel selector 14 of the embodiment uses and improves further the concept of Z-key.

Figure 4:
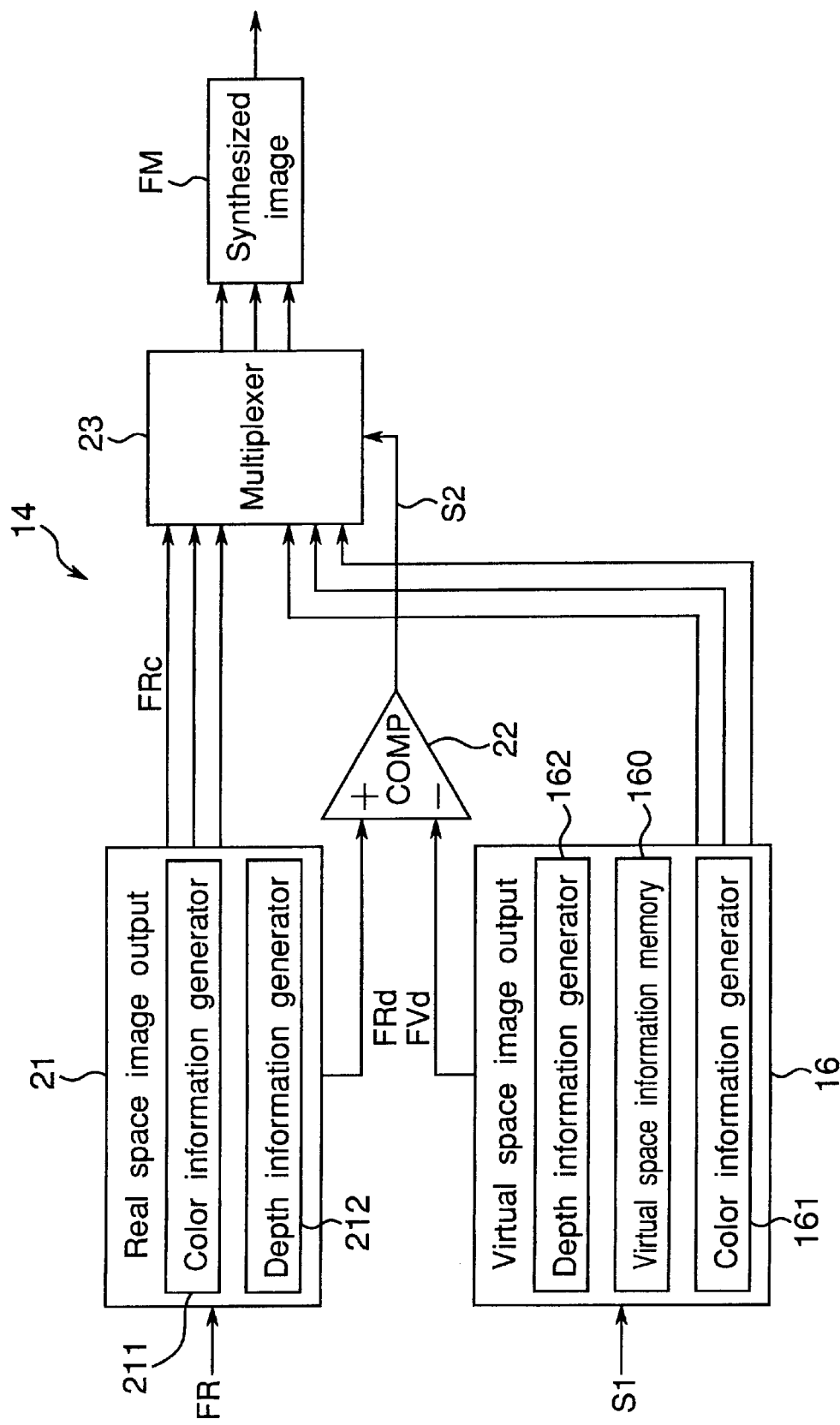
FIG. 4 is a block diagram of a cover pixel selector of the display apparatus.

FIG. 4 is a block diagram of the cover pixel selector 14 and the virtual space image output section 16 of the display apparatus 1. The cover pixel selector 14 comprises a real space image output section 21, a comparator 22 and a selector 23. The real space image output section 21 has a color information generator 211 and a depth information generator 212. The color information generator 211 generates color information FRc based on the real space image FR obtained by the cameras 12, and the depth information generator 212 generates depth information (or distance information) FRd for each pixel in the real space image FR. The signal S1 from the position detector 15 is also used for the depth information. Because the depth information corresponds to the real space distance image, the depth information FRd is also referred to as real space distance image. The color information FRc may be the same as the real space image FR.

FIG. 4 also shows the virtual space image output section 16 having a virtual space information memory 160, a color information generator 161 and a depth information generator 162. The virtual space information memory 160 stores the virtual space information DV. The color information generator 161 generates color information FVc on the basis of the signal S1 and the virtual space information DV. The depth information generator 162 generates depth information (or distance information) FVd for each pixel in the color information FVc. Because the depth information FVd corresponds to the virtual space distance image, the depth information FVd is also referred to as virtual space distance image FVd. The color information FVc may be the same as the virtual space image FV.

The comparator 22 compares the real space distance image FRd with the virtual space distance image FVd and outputs a signal S2 as a result of the comparison.

The selector 23 or a multiplexer selects the image data of the pixel which is nearer to the viewing point among the real space image FR and the virtual space image FV according to the signal S2 from the comparator 22. Thus, the selector 23 outputs a synthesized image FM which is a set of pixel data of the pixels nearer to the viewing point.

By providing the above-mentioned selector 14 in the display apparatus 1, it is not needed to deduce a stereoscopic structure in the real space when the real space and the virtual space are integrated in one space. That is, by representing the real space image FR and the virtual space image FV with the color information FRc, FVc and the depth information FRd, FVd, the above-mentioned simple circuit can integrate the real space and the virtual space in the level of electrical signals. Such a feature is very useful for an application such as augmented reality which requires real time processing.

In order to apply the concept of Z-key to augmented reality, it is needed to measure distance image in the viewing point coordinate system in real time. For such high speed measurement of distance image, systems such as video-rate stereo machine and a silicon range finder are proposed. However, these systems are not suitable for measuring the distance image because of low resolution or large-scaled size.

Then, in the display apparatus 1, a distance image from the left and right eyes 10E is obtained from the images picked up by the cameras 12 at the positions conjugate to the eyes. That is, the real space distance image FRd is obtained by using two real space images FR picked up by the camera 12 for the left and right eyes.

Four factors of the movements of the image picked up by the cameras 12 are translations and rotations of the head and the object. Generally, in order to construct a head mounted display, it is needed to measure the position of the head in real time. In the display apparatus 1, information on the movement of the head is obtained by a known method. Thus, when the object is stationary, the distance to the object can be calculated uniquely from the movement of the image picked up by the cameras 12.

Figure 5A:
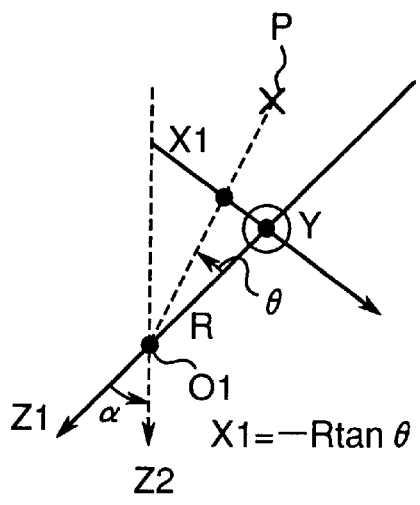
FIG. 5A and FIG. 5B are diagrams for illustrating cancellation of the rotation movement of a head of an observer.
Figure 5B:
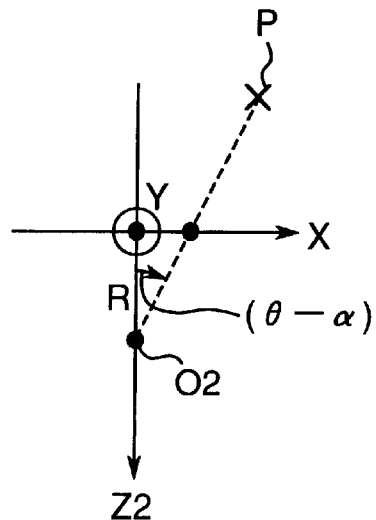

Next, a method is explained for calculating distance image from the translation of the head by subtracting the rotation of the head from the movement of the image. FIGS. 5A and 5B are diagrams for illustrating cancellation of the rotation of a head. In the coordinate system shown in FIG. 5A having a viewing point (position of the eye) $O_1$, X and Z1 axes lie on the surface of the paper, while Y axis is normal to the surface. Reference sign R represents a distance between the viewing point and a pixel in a picture II (X1-Y1 plane). The viewing direction is shifted by an angle $\theta$ from the object P to the left side. It is assumed here that the viewing direction of the observer is changed around Y axis by an angle $\alpha$ or the observer moves from the coordinate system of the viewing point $O_1$ to another coordinate system of the viewing point $O_2$ shown in FIG. 5B, as shown with Z2 axis represented with a dashed line. If the observer observes in a direction opposite to Z1 direction before the movement, the object P will be observed in the picture II (X2-Y2 plane) to be shifted by an angle of $(\theta-\alpha)$ to the right side. The length $L_h$ of the shift in the picture II is expressed as follows:

$$L_h = -R \tan(\theta-\alpha) + R \tan\theta = -(R^2+X^2)/R \tan\alpha + X_1, \qquad (1)$$

Therefore, the rotation of the head (or the viewing point) can be canceled by translating the pixels by a length $L_h$ determined by Eq. (1). Similarly, rotation around X axis can also be canceled.

This calculation is performed by the depth information generator 212. Thus, the direction of the line of sight does not change irrespectively of the movement of the observer. Then, the distance or depth of the object P from the viewing point can be calculated on the basis of the amount of the movement of the observer and the movement of the pixels accompanied by the movement.

Figure 6:
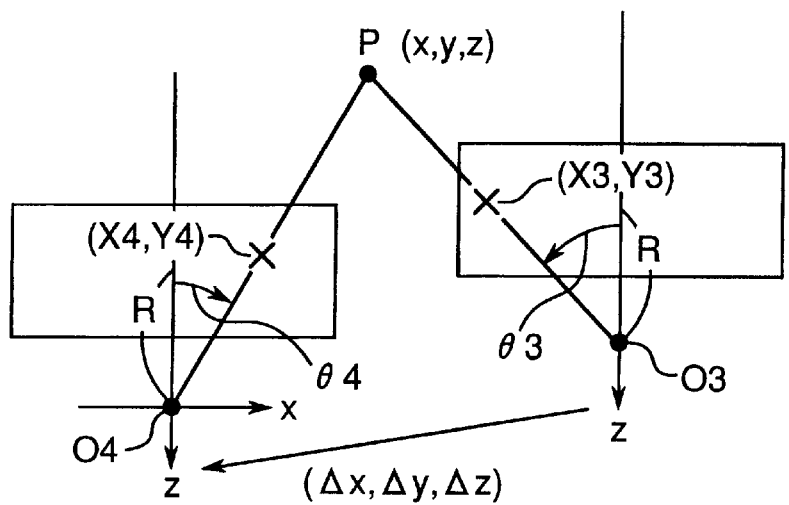
FIG. 6 is a diagram for explaining calculation of depth accompanied by movement of the head.

FIG. 6 is a diagram for explaining calculation of the depth accompanied by movement of the head. It is assumed that when the observer is moved by $(\Delta X, \Delta Y, \Delta Z)$, the pixel at (X3, Y3) is moved to (X4, Y4). Then, the depth Z of the object P from the viewing point is calculated in the coordinate system $O_4$ as follows:

$$x/X_4 = z/R,$$

$$(x+\Delta x)/X_3 = (z+\Delta z)/R,$$

$$y/Y_4 = z/R,$$

and $$(y+\Delta y)/Y_3 = (z+\Delta z)/R. \qquad (2)$$

Then, $$z = (X_3\Delta z - R\Delta x)/(X_4-X_3) \qquad (3)$$

$$z = (Y_3\Delta z - R\Delta y)/(Y_4-Y_3). \qquad (4)$$

Eqs. (2) assume implicitly that the object P and its image exist in an epipolar plane before and after the movement. Therefore, if the values of Eqs. (3) and (4) are different from each other, it is found that the object P is not fixed.

A case where the observer 10 moves is explained above. However, the viewing point is moved only if the observer 10 rotates the head. Then, the depth can also be calculated in such a case since the eye 10E or the viewing point performs both rotation and translation according to the rotation of the head.

A change in the position or the direction of the head, the viewing point and the line of sight direction can be determined according to the signal S1 received from the position detector 15. The position relation of the head to the eye is known, and it is set beforehand.

In the above-mentioned algorithm, a distance image can be calculated with simple calculations of addition, subtraction, multiplication and division if an optical flow can be calculated. Further, results on the other pixels are not needed in the calculation of the depth. Then, calculation can be omitted for pixels for which the depth calculation is not necessary. Thus, the depth calculation can be performed at high speed, and this feature contributes largely to integrate the real space image FR and the virtual space image FV in an image at high speed.

As explained above, the coordinates of the object P in the viewing point coordinate system has always a predetermined relation to the position of its image. In the display apparatus, the position of the head is detected constantly and the position relation between the head and the eyes 10E is also known. Then, the relation of the viewing point coordinate system before and after the movement can be calculated easily. Therefore, if the correspondence relation of the positions in the images before and after the movement is found, the depths of a pixel from the viewing point before and after the movement can be determined uniquely by using the two conditions.

This is explained for the ease of understanding the invention in a case where the above-mentioned equations are generalized.

Figures 7, 8:
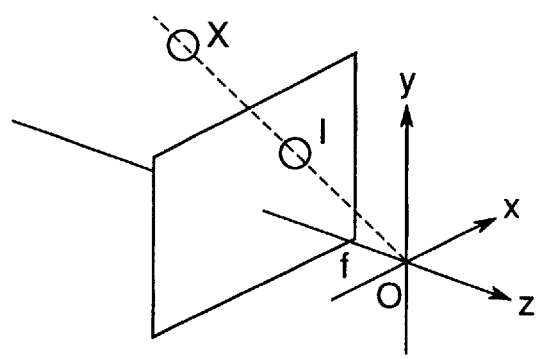
FIG. 7 is a diagram for explaining distance measurement using a difference caused by movement.
FIG. 8 is another diagram for explaining distance measurement using a difference caused by movement.

First, distance measurement due to a viewing difference in movement is explained. As shown in FIG. 7, when the viewing point is moved from $O_1$ to $O_2$, the depth of the object from the viewing point $O_2$ is calculated by using the images at the viewing points $O_1$ and $O_2$ and a transformation matrix $T^2_1$ between viewing point coordinate systems. In FIG. 7, "R" represents a part of rotation matrix and "t" represents a translation vector of a translation matrix "T". The superscripts "1" and "2" represent before movement and after movement. For example, $I^1$ represents a pixel before transformation. The subscript "z" represents a component in z direction. For example, $X_z$ represents z component or depth of the coordinate of the object, and $t_z$ represents z component of a translation vector t.

FIG. 8 shows a calculation of the image I of the object by using coordinate value x in the viewing point coordinate system where f denotes focal depth of the camera. Next, the cancellation of the rotation is explained. An image I' is calculated in the viewing angle coordinate system $O_1'$ having the same directions of the coordinate axes and the viewing point coordinate system $O_2$ and having the same origin as the viewing point coordinate system $O_1$.

$$I^1 = -(x^1/x_z^1)f,$$

$$I^{1'} = -(x^{1'}/x_z^{1'})f,$$

and $$x^{1'} = Rx^1.$$

Then, $$I^{1'} = -[RI^1/(RI^1)_z]f.$$

By converting the pixel $I^1$ as shown above, a change in image due to rotation is canceled.

Next, calculation of depth in translation is explained.

$$I^2 = -(x^2/x_z^2)f,$$

$$I^{1'}(I^2) = -(x^{1'}/x_z^{1'})f,$$

and $$x^2 = t + x^{1'}.$$

Then, $$X_z^2(I^{1'} - I^2) = ft + t_z I^{1'}.$$

Thus, if the pixel $I_1$, is in correspondence to $I_2$ is determined, the depth can be calculated by using the above relation.

As explained above, the real space image FR and the virtual space image FV can be integrated in an image at the level of electrical signals by the display apparatus 1. Because the real space distance image FRd is calculated on the basis of the real space image FR, a calculation cost becomes lower than the estimation of three dimensional structure of the real world or the model fitting. Thus, the processing time is shortened and the processing can be performed at high speed. This is advantageous for real time processing.

Further, because the depth information FRd of each pixel is determined by using the pixel data of the real space image FR, position adjustment is not needed between the real space distance image FRd and the virtual space distance image FVd.

Because the real space distance image FRd is determined on the basis of the two real space images FR picked up by one camera 12, it is not needed to search the correspondence between the two images in contrast to a case where two real space images picked up by two cameras are used, and this is advantageous for the search speed.

Further, since the period for picking up the real space image FR by the camera 12 is about a thirtieth second, the amount of the movement of the observer is usually small. Then, the distance between the two images is small, and the vector of the movement in the image is small.

Because the depth measurement is performed with point tracking, the search results on the correspondence around the space can be used easily, Further, the results of previous measurements can also be used easily.

Further, the cameras 12 for picking up the real space image FR and the virtual space image FV and the display section 13 are arranged in the same line as the line of sight of the observer. In other words, three means, that is, the cameras 12 as a pickup means, the cameras 12 as a means for distance measurement, and the display section 13 as a display means are arranged in the same line of sight. Then, the observer 10 can observe the image without feeling unusual.

Because the position detector 15 is used both for the calculating the real space distance image FRd and for supplying the virtual space image FV and the virtual space distance image FVd, the apparatus can be fabricated to have a light weight at a lower cost.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method for displaying a real space image and a virtual space image, the method comprising the steps of:

providing a pickup device at a position conjugate to eyes of an observer;

picking up an image of real space by the pickup device to thereby provide a real space image wherein the real space image includes a plurality of first pixels, each of said first pixels representing a respective portion of the image of real space;

obtaining a virtual space image based on virtual space information wherein the virtual space image includes a plurality of second pixels, each of said second pixels representing a respective portion of the virtual space information, wherein each individual one of said second pixels corresponds to a respective individual one of said first pixels;

determining, for each one of said first pixels, a distance from the observer to a location in real space of the portion of the image of real space corresponding to the respective first pixel; and comparing, for each one of the first pixels, the distance from the observer to the location in real space corresponding to the respective first pixel with a distance from the observer to an apparent location in virtual space associated with the corresponding second pixel, and selecting whichever of the respective first pixel and the corresponding respective second pixel which corresponds to a location which is nearer to the observer in order to present a synthesized image of the virtual space image and the real space image to the observer.

2. A method according to claim 1, wherein the distance from the observer to the location in real space corresponding to a respective first pixel is determined by detecting a movement of the observer.

3. A method according to claim 1, wherein the distance from the observer to the location in real space corresponding to a respective first pixel is calculated according to a translation of the observer after canceling an effect of a rotation of the observer in a movement of an object in the image of real space.

4. A method according to claim 1, wherein a position of the observer is continuously monitored, and the distance from the observer to the location in real space corresponding to a respective first pixel is calculated by using the position of the observer.

5. A display apparatus for displaying a real space image and a stored virtual space image at the same time, the display apparatus comprising:

a pickup device provided at a position conjugate to eyes of an observer for picking up an image of real space to thereby provide a real space image including a plurality of first pixels, each of said first pixels representing a respective portion of the image of real space;

a stored virtual space image including a plurality of second pixels, each of said second pixels representing a respective portion of stored virtual space information, wherein each individual one of said second pixels corresponds to a respective individual one of said first pixels;

a position detector for detecting a position of a viewing point of the observer;

a real space distance image generator for generating a real space distance image on the basis of the position of the viewing point detected by said position detector and locations in real space corresponding to the real space image, the real space distance image including a plurality of first distance data points, each individual one of said first distance data points corresponding to a respective individual one of said first pixels in the real space image;

a virtual space distance image generator for generating a virtual space distance image on the basis of the position of the viewing point detected by said position detector and apparent locations in virtual space corresponding to the stored virtual space image, the virtual space distance image including a plurality of second distance data points, each individual one of said second distance data points corresponding to a respective individual one of said second pixels in the stored virtual space image, each individual one of said second distance data points corresponding to a respective individual one of said first distance data points in the real space distance image;

a comparator for comparing, for each individual one of said first distance data points and a corresponding individual one of said second distance data points, a first distance data point with a corresponding second distance data point;

a selector for selecting, for each of said individual first pixels in the real space image and each of said individual second pixels in the stored virtual space image, whichever of an individual first pixel in the real space image and the corresponding individual second pixel in the stored virtual space image has a corresponding individual distance data point which is nearer to the observer on the basis of an output of the comparator; and a display assembly for presenting a thus synthesized image including individual pixels whose corresponding individual distance data points are nearer to the observer thus selected by said selector.

6. A display assembly according to claim 5, wherein said real space distance image generator is adapted to generate the real space distance image on the basis of a plurality of images of real space picked up by said pickup device.

7. A display apparatus according to claim 5, wherein said display apparatus is a head mounted display device.

8. A display apparatus according to claim 5, wherein said display assembly includes a display device, for displaying the synthesized image, and a mirror, arranged in a line of sight of the observer, to reflect the synthesized image from the display device to the observer.

9. A display apparatus according to claim 5, wherein said position detector includes a displacement sensor for detecting a movement of a head of the observer, wherein said real space distance image generator can use output data produced by said displacement sensor to generate the real space distance image.

10. A display apparatus for displaying a real space image and a virtual space image, the display apparatus comprising:

a pickup device for picking up a first image of real space to provide a first two dimensional image, the first two dimensional image including a plurality of first pixels, each of said first pixels representing a respective portion of the first image of real space;

a position detector for detecting a position of a viewing point of an observer;

a distance measurement device for generating first distance information on the basis of the position of the viewing point detected by said position detector and locations corresponding to the first image of real space, the first distance information including a plurality of first data points, each individual one of said first data points corresponding to a respective individual one of said first pixels in the first two dimensional image;

a device for outputting a second two dimensional image and second distance information on the basis of output data of said position detector and stored virtual space information, said second two dimensional image including a plurality of second pixels, each of said second pixels representing a respective portion of the stored virtual space information, each individual one of said second pixels corresponding to a respective individual one of said first pixels in the first two dimensional image, the second distance information including a plurality of second data points, each individual one of said second data points corresponding to a respective individual one of said second pixels in the second two dimensional image, wherein each individual one of said second data points corresponds to a respective individual one of said first data points in the first distance information;

a comparator for comparing, for each individual one of said first data points and a corresponding one of said second data points, a first data point of the first distance information with a corresponding second data point of the second distance information;

a selector for selecting, based on an output from said comparator, whichever of a respective one of said first pixels in the first two dimensional image and the corresponding one of said second pixels in the second two dimensional image which corresponds to a location which is nearer to the observer, wherein said first pixel in the first two dimensional image corresponds to a first data point processed by said comparator and said corresponding second pixel in the second two dimensional image corresponds to a second data point processed by said comparator;

a display device for displaying the pixels selected by said selector as a synthesized image;

wherein said pickup device, said distance measurement device and said display device are arranged in a direction which is substantially the same as a viewing direction of the observer.

11. A display apparatus according to claim 10, wherein said pickup device picks up a plurality of images of real space to provide a plurality of first two dimensional images and wherein said distance measurement device generates the first distance information on the basis of said plurality of first two dimensional images.

12. A display apparatus according to claim 10, wherein said pickup device is positioned at a position conjugate to eyes of said observer.

13. A display apparatus according to claim 10, wherein said display device is a head mounted display device.

14. A display apparatus according to claim 10, wherein said display device includes a display unit, for displaying the synthesized image, and a mirror, arranged in a line of sight of the observer to reflect the synthesized image from the display unit to the observer.

15. A display apparatus according to claim 10, wherein said position detector includes a displacement sensor for detecting movement of a head of the observer, and wherein the distance measurement device can use output data produced by the displacement sensor to generate the first distance information.

16. A display apparatus for displaying a real space image and a virtual space image, the display apparatus comprising:

a pickup device for picking up a first image of real space to provide a first two dimensional image including a plurality of first pixels, each of said first pixels representing a respective portion of the first image of real space;

a position detector for detecting a position of a viewing point of an observer;

a distance measurement device for generating first distance information on the basis of the position of the viewing point detected by said position detector and locations corresponding to the first two dimensional image, the first distance information including a plurality of first data points, each individual one of said first data points corresponding to a respective individual one of said first pixels in the first two dimensional image;

a device for outputting a second two dimensional image and second distance information on the basis of output data of said position detector and stored virtual space information, said second two dimensional image including a plurality of second pixels, each of said second pixels representing a respective portion of the stored virtual space information, each one of said second pixels corresponding to a respective individual one of said first pixels in the first two dimensional image, said second distance information including a plurality of second data points, each individual one of said second data points corresponding to a respective individual one of said second pixels in the second two dimensional image, wherein each individual one of said second data points corresponds to a respective individual one of said first data points in the first distance information;

a comparator for comparing, for each individual one of said first data points and a corresponding one of said second data points, a first data point of the first distance information with a corresponding second data point of the second distance information;

a selector for selecting, based on an output from said comparator, whichever of a respective one of said first pixels in the first two dimensional image and the corresponding one of said second pixels in the second two dimensional image represents a location nearer to the observer, wherein said first pixel in the first two dimensional image corresponds to a first data point processed in said comparator and said corresponding second pixel in the second two dimensional image corresponds to a second data point processed in said comparator;

a display device for displaying the pixels selected by said selector as a synthesized image; and wherein said distance measurement device is configured to measure the first distance information on the basis of a plurality of first two dimensional images picked up at different spatial positions by the pickup device and outputs of said position detector at said spatial positions.

17. A display apparatus according to claim 16, wherein the pickup device is configured to pick up a plurality of first images of real space to provide a plurality of first two dimensional images and the distance measurement device is configured to generate first distance information on the basis of said plurality of first two dimensional images.

18. A display apparatus according to claim 16, wherein said pickup device is positioned at a position conjugate to eyes of an observer.

19. A display apparatus according to claim 16, wherein said display device is a head mounted display device.

20. A display apparatus according to claim 16, wherein said display device includes a display unit, for displaying the synthesized image, and a mirror arranged in a line of sight of the observer to reflect the synthesized image from the display unit to the observer.

21. A display apparatus according to claim 16, wherein said position detector includes a displacement sensor for detecting movement of a head of the observer, and wherein said distance measurement device can use output produced by said displacement sensor to generate the first distance information.

22. A method according to claim 1, wherein the distance from the observer to a location in real space corresponding to a respective one of the first pixels in the real space image is determined by a process including the steps of:

picking up a first image of real space to provide a first real space image and picking up a second image of real space to provide a second real space image;

identifying an object that is represented in each of the first real space image and the second real space image;

determining a location value for each of the first real space image and the second real space image, wherein each location value represents a distance from the observer to a location in real space corresponding to a position of said object in the respective real space image;

determining a displacement value representing the difference between the location values for said object in the first real space image and the second real space image;

determining a rotation value representing a rotation from the observer to a location in real space corresponding to an amount of displacement of said object between the first real space image and the second real space image that results from a rotation of the observer;

determining a translation value by canceling the rotation value from the displacement value; and utilizing said translation value to calculate the distance from the observer to a location in real space corresponding to each individual one of the first pixels in a first real space image.

23. A method according to claim 22, further including the step of continuously repeating the steps of claim 22 for a plurality of images of real space.

24. A display apparatus comprising:

a first output device for outputting first image data and first distance data based on an image of real space, said first distance data representing a distance from an observer to a location in real space corresponding to at least a portion of the first image data;

a second output device for outputting second image data and second distance data based on virtual space information, said second distance data representing a distance from an observer to an apparent location in virtual space corresponding to at least a portion of the second image data;

a comparing and selecting device for comparing at least one datum of said first distance data with a corresponding at least one datum of said second distance data to determine a smaller one thereof and for selecting whichever of said at least a portion of said first image data and the corresponding respective portion of said second image data which corresponds to said smaller one; and a display device for displaying thus selected image data supplied by said comparing and selecting device.

25. A display apparatus according to claim 24, wherein said first image data comprises a plurality of first pixels, and said second image data comprises a plurality of second pixels, each individual one of said second pixels corresponding to an individual one of said first pixels; and wherein, for each individual one of said second pixels, said comparing and selecting device compares first distance data to corresponding second distance data.

26. A display apparatus according to claim 24, wherein said first image data outputted by said first output device corresponds to an image of real space picked up at a position conjugate to eyes of an observer.

* * * * *

UNITED STATES PATENT AND TRADEMARK OFFICE
CERTIFICATE OF CORRECTION

PATENT NO. : 6,045,229
DATED : April 4, 2000
INVENTOR(S) : Susumu TACHI, Taro MAEDA, and Shinsuke SUZUKI It is certified that error appears in the above-indentified patent and that said Letters Patent is hereby corrected as shown below:

ON THE TITLE PAGE:

Item [73] Assignee:, after "Japan", insert

--; and Susumu Tachi, Tsukuba-Shi, Japan--.

Signed and Sealed this

Twenty-seventh Day of March, 2001

Attest:

NICHOLAS P. GODICI

Attesting Officer

*Acting Director of the United States Patent and Trademark Office*